(12) United States Patent
Simske et al.

(10) Patent No.: US 9,477,853 B2
(45) Date of Patent: Oct. 25, 2016

(54) GENERATING AN INCREMENTAL INFORMATION OBJECT

(75) Inventors: Steven J Simske, Fort Collins, CO (US); A. Marie Vans, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 143 days.

(21) Appl. No.: 14/235,866

(22) PCT Filed: Sep. 8, 2011

(86) PCT No.: PCT/US2011/050794
§ 371 (c)(1),
(2), (4) Date: Jan. 29, 2014

(87) PCT Pub. No.: WO2013/036228
PCT Pub. Date: Mar. 14, 2013

(65) Prior Publication Data
US 2014/0191027 A1 Jul. 10, 2014

(51) Int. Cl.
| | |
|---|---|
| *G06K 5/00* | (2006.01) |
| *G06K 19/06* | (2006.01) |
| *G06Q 10/06* | (2012.01) |
| *G06K 9/00* | (2006.01) |

(52) U.S. Cl.
CPC ............. *G06K 5/00* (2013.01); *G06K 9/00201* (2013.01); *G06K 19/06056* (2013.01); *G06Q 10/063* (2013.01); *G06Q 10/0633* (2013.01); *G06Q 10/06316* (2013.01); *G06K 19/06037* (2013.01)

(58) Field of Classification Search
CPC ................... G06Q 10/06316; G06Q 10/0633; G06Q 10/0637; G06Q 10/06395; G06Q 10/063; G06K 19/06056; G06K 19/06037; G06K 5/00; G06K 9/00201; G06F 21/6209; G06F 17/30011; G06F 2221/2141; H04L 9/3247; H04L 2209/60
USPC ................ 235/375, 462.01, 462.04; 707/608
See application file for complete search history.

(56) References Cited

U.S. PATENT DOCUMENTS

| | | | | |
|---|---|---|---|---|
| 5,576,528 | A | * | 11/1996 | Chew et al. ................... 235/469 |
| 5,805,135 | A | * | 9/1998 | Suzuoki et al. ............... 345/420 |
| 6,292,786 | B1 | * | 9/2001 | Deaton et al. ............. 705/14.25 |
| 6,295,303 | B1 | * | 9/2001 | Ogino ....................... H04J 3/12 370/515 |
| 6,398,117 | B1 | * | 6/2002 | Oakeson et al. .............. 235/494 |
| 6,483,540 | B1 | * | 11/2002 | Akasawa et al. ............. 348/239 |
| 6,763,144 | B1 | * | 7/2004 | Gershony ..................... 382/274 |
| 7,185,816 | B1 | * | 3/2007 | Shoobridge .............. 235/462.04 |

(Continued)

FOREIGN PATENT DOCUMENTS

| | | |
|---|---|---|
| JP | 07-175883 A | 7/1995 |
| JP | 11-312215 A | 11/1999 |

(Continued)

*Primary Examiner* — Daniel Walsh
(74) *Attorney, Agent, or Firm* — International IP Law Group, PLLC (57) ABSTRACT

Systems and methods for generating an incremental information object (IIO) from an information object (IO). The method includes analyzing an IO to identify code, wherein the IO is made up of a number of tiles, and wherein the tiles make up a code. The method also includes confirming the code. If the code is successfully confirmed, the method further includes modifying the IO by adding binary information IO the IO through the use of color scales that are not recognizable by an optical IO reader, generating a new progressive code comprising a bitstream, and overwriting the bitstream on the tiles.

15 Claims, 8 Drawing Sheets

(56) References Cited

U.S. PATENT DOCUMENTS

| | | | |
|---|---|---|---|
| 7,246,748 B1 * | 7/2007 | Feuerman | G06K 17/0022 235/462.09 |
| 7,424,672 B2 * | 9/2008 | Simske | G06K 9/00442 715/243 |
| 7,469,833 B1 * | 12/2008 | Kelley | G06K 17/0022 235/376 |
| 7,578,443 B1 * | 8/2009 | Harris | 235/462.01 |
| 7,597,262 B2 | 10/2009 | Wang | |
| 7,660,019 B2 * | 2/2010 | Gonzalez | G06F 3/03545 358/3.28 |
| 7,673,807 B2 * | 3/2010 | Simske | G06K 7/10722 235/462.01 |
| 7,702,162 B2 * | 4/2010 | Cheong | G06K 19/06037 235/494 |
| 7,712,665 B2 * | 5/2010 | Ortiz | G06K 7/1434 235/462.04 |
| 7,967,207 B1 | 6/2011 | Harris | |
| 8,798,328 B2 * | 8/2014 | Simske | G06K 9/00577 382/100 |
| 8,857,711 B2 * | 10/2014 | Simske | G06Q 30/0201 235/380 |
| 8,857,727 B2 * | 10/2014 | Simske et al. | 235/494 |
| 8,915,450 B2 * | 12/2014 | Simske | 235/494 |
| 9,027,147 B2 * | 5/2015 | Simske | G06F 21/60 726/26 |
| 9,087,252 B2 * | 7/2015 | Simske et al. | |
| 9,092,745 B2 * | 7/2015 | Simske | G06Q 10/06 |
| 2003/0052179 A1 * | 3/2003 | Pinson | 235/494 |
| 2004/0172587 A1 | 9/2004 | Lawlor | |
| 2005/0269416 A1 * | 12/2005 | Sussmeier | G06K 7/12 235/494 |
| 2008/0035730 A1 * | 2/2008 | Look | 235/462.07 |
| 2008/0250479 A1 * | 10/2008 | Matoba | 726/5 |
| 2009/0154810 A1 * | 6/2009 | Enomoto | G06K 9/00 382/182 |
| 2009/0166418 A1 * | 7/2009 | Onoda et al. | 235/435 |
| 2009/0250512 A1 * | 10/2009 | Deck et al. | 235/375 |
| 2010/0149187 A1 * | 6/2010 | Slavin | G06K 1/12 345/441 |
| 2010/0155479 A1 * | 6/2010 | Ming | G06K 17/00 235/462.1 |
| 2010/0243747 A1 * | 9/2010 | Saito | G06K 19/06028 235/494 |
| 2012/0263343 A1 * | 10/2012 | Simske | G06K 9/00577 382/100 |
| 2012/0280029 A1 * | 11/2012 | Simske | G06K 19/06037 235/375 |
| 2012/0286028 A1 * | 11/2012 | Simske | G06Q 10/06 235/375 |
| 2013/0193217 A1 * | 8/2013 | Simske | G06F 21/6209 235/494 |
| 2013/0193218 A1 * | 8/2013 | Simske et al. | 235/494 |
| 2014/0027515 A1 * | 1/2014 | Simske | G06K 19/06037 235/454 |
| 2014/0042228 A1 * | 2/2014 | Simske | G06F 21/36 235/462.01 |
| 2014/0153053 A1 * | 6/2014 | Shinohara | 358/2.1 |
| 2014/0191027 A1 * | 7/2014 | Simske | G06Q 10/0633 235/375 |
| 2014/0231510 A1 * | 8/2014 | Simske | G06Q 30/0201 235/380 |
| 2014/0337984 A1 * | 11/2014 | Simske | G06F 21/60 726/26 |
| 2014/0339312 A1 * | 11/2014 | Simske et al. | 235/462.04 |
| 2015/0220521 A1 * | 8/2015 | Simske | G06Q 10/103 707/608 |
| 2015/0294242 A1 * | 10/2015 | Simske | G06Q 10/06 235/375 |
| 2015/0356324 A1 * | 12/2015 | Simske | G06K 1/12 235/494 |
| 2016/0063510 A1 * | 3/2016 | Simske | G06Q 30/0185 235/375 |

FOREIGN PATENT DOCUMENTS

| | | |
|---|---|---|
| WO | WO-9850882 A2 | 11/1998 |
| WO | WO0124106 A1 | 1/2001 |

* cited by examiner

GENERATING AN INCREMENTAL INFORMATION OBJECT

BACKGROUND

Products may include both physical and information-containing items, such as produce, documents, labels, books, software, images, and the like. During the lifecycle of the product, it may progress through a workflow, such as from a manufacturer, through a chain of distributors, and on to a consumer. As used herein, a workflow is a defined set of stages and transitions or transformations between stages, usually with a task to be performed at each stage, which a product must pass through during its lifecycle. For example, a document may be drafted by a first person, then flow through a number of different editors, prior to being issued to customers or clients in final form. As another example, a manufacturer may package a product for sale to another manufacturer, such as a bundled software package to be sold with a computer.

A bar code may be associated with a product for numerous reasons. For example, a bar code may protect an associated product from counterfeiting and other falsifications. The same bar code may be used throughout the workflow to identify the product. However, this approach does not enable one to monitor the status of the workflow via the bar code. Multiple bar codes may be added, for example, by each entity within a workflow. This may be used to identify the product as it moves from one stage to the next in its workflow. For example, multiple barcodes may be used to confirm the identity of the last party to handle the product. However, the use of multiple bar codes may take a substantial amount of space.

BRIEF DESCRIPTION OF THE DRAWINGS

Features and advantages of examples of the present disclosure will become apparent by reference to the following detailed description and drawings, in which like reference numerals correspond to similar, though perhaps not identical, components.

DETAILED DESCRIPTION

Examples discussed herein may be used to adapt an information object to generate an incremental information object (IIO) during a workflow. As used herein, an "information object" (IO) is any type of standard mark that is used to convey information about a product or service, such as a barcode. The IO is static and may be read by a standard optical IO reader. In addition, as used herein, an IO that has additional incremental information added is termed an "IIO." The IIO that is generated may be readable using a standard reader, such as a bar code reader. Thus, it may still be recognized by an already publicly available reader and reading software, or firmware optical IO reader, as the initial IO, even if it contains additional progressive information, for example, in the form of colors. In this manner, the functionality of the standards-compliant payload of the IO is not compromised or altered by the presence of the progressive information. As used herein, "adapt" indicates that the amount of information in the IO may be increased to match the needs of the workflow. The information density of the IO may be termed the complexity of the IO. Thus, the complexity of an IO may be changed to generate an IIO to accommodate changes in the document's set of stages, security needs, and the like, and will work for both print-scan and wholly electronic workflows. This includes changing the overall number of writeable bits in the IO, for example, by increasing the complexity of the IO through the addition of color scales written to the white tiles.

The adaptability may be provided by adding colors or grayscale levels allowed for the individual data module, or tiles, in the IO. For example, additional colors or intensities may be recorded in the IO. The added colors may be very light or very dark, depending on whether the colors are being added to light or dark tiles, respectively. Therefore, the IO may still be readable by a standard barcode reader, even though progressive information has been added to the IO in the form of colors.

In an example, an overprinting approach may be used for the addition of progressive information to an IO. An overprinting approach is one in which each successive state is the result of adding new colors on top of tiles that may already be colored. As an example, in the case of overprinting, it is not possible to change a tile from "yellow" to "magenta" by overwriting "cyan" onto the yellow tile. Instead, "green" would be used in place of "magenta," since overprinting "yellow" with "cyan" produces "green." The determination of whether overprinting is allowed may be made by the particular company that is utilizing the IIO and may be used as an additional security measure, since the company will know what to expect in terms of the progression of tile colors. For example, if a certain company has specified that overprinting is not allowed for a particular IIO on a product, and someone fraudulently alters a yellow tile to a green tile on that IIO, the IIO would be easily recognized as invalid.

The additional information contained within an IIO may be decoded using a software program configured to read IIO's. As used herein, a software program is a set of computer-readable instructions that direct a processor to perform specific functions. In an example, the software program may be embedded in an advanced optical IO reader. The advanced optical IO reader may contain software that is adapted to recognize smaller differences in intensity than a standard optical IO reader. In addition, the advanced optical IO reader may contain additional software that is adapted to interpret changes in hue as being indicative of changes in the information content of the IO.

As described herein, a workflow is a defined set of stages, usually with tasks at each stage, through which a product may pass during its lifecycle. A workflow may begin with an IO or other standard mark on a product. In an example, the workflow is a process during which documents, information, tasks, or products are passed from one participant to another for action or informative purposes, according to a set of procedural rules.

Workflows may include any number of actions for processing the product. For example, a workflow for an image may include actions such as quality assurance, authentication, forensics, and the like. A supply chain workflow may include actions such as tracking, tracing, inspection, shipping, receiving, recall, among others. Workflows may also include other workflows. For example, a manufacturing workflow may include environmental workflows, sensor data monitoring workflows, compliance workflows, auditing workflows, and statistical workflows, such as inventory, average time in a stage, and the like. Thus, a workflow may be defined as a set of tasks associated with generating, implementing, producing, or distributing a product. In addition, a workflow may be conditional. In other words, a workflow may progress to different possible stages depending on the desired progression for each individual case.

In general, an IIO is a feature or mark carrying information that may be useful for tracing, tracking, state indication, data embedding, authentication, identification, or any other operations that may be used to provide information as a product progresses through the stages of a workflow. As used herein, all of these operations are encompassed by the general term "confirming." The IIO can maintain a size, a shape, or both, as the item moves through the workflow, even though information may be added at each stage of the workflow. The IIO may be designed taking into account security needs, the type of readers available, and other concerns, such as branding, fraud prevention, robustness to damage, and the like. For example, the IIO may include a binary barcode, in which the state of each tile in a field of tiles in a two dimensional matrix encodes a bit in a bitstream.

The IIO that is generated from the IO may be a two-dimensional or three-dimensional glyph or mark that can be incrementally overwritten throughout the workflow to form an identifying object having increasing data content at each stage. For example, the IIO may include a three dimensional (3D) grayscale barcode, in which a field of tiles in a two dimensional matrix encodes information and a grayscale state is used to encode a third dimension at each tile. As another example, the IIO may include a 3D color barcode, in which a field of tiles in a two dimensional matrix encodes information and a color state is used to encode a third dimension, e.g., multiple bits, at each tile.

In some examples, such as the primary example herein, the IIO may incorporate a standard barcode, such as a black and white universal product code (UPC), to which additional information is added. The added information may take the form of colored lines that are not readable by a standard barcode reader, such as a point-of-purchase terminal. In an example, the IIO may be a physical mark on a product, such as a printed document or a label on a package. Further, the IIO may be an electronic object in a document, which may be displayed as a mark on a viewing device. In another example, the IIO may be printed with the product and can appear as a mark on a first page of a document.

In an example, the IIO may be read either from the physical object or from the viewing device using any image capture device, such as specialized handheld or mobile device, or an advanced optical IO reader. In some examples, a virtual barcode reader may be used to read the IIO from an electronic document, without using a physical device. In some examples, a software object may locate and extract the image from an electronic document. As used herein, the term "optical IO reader" includes all of these devices or techniques.

Figure 1:
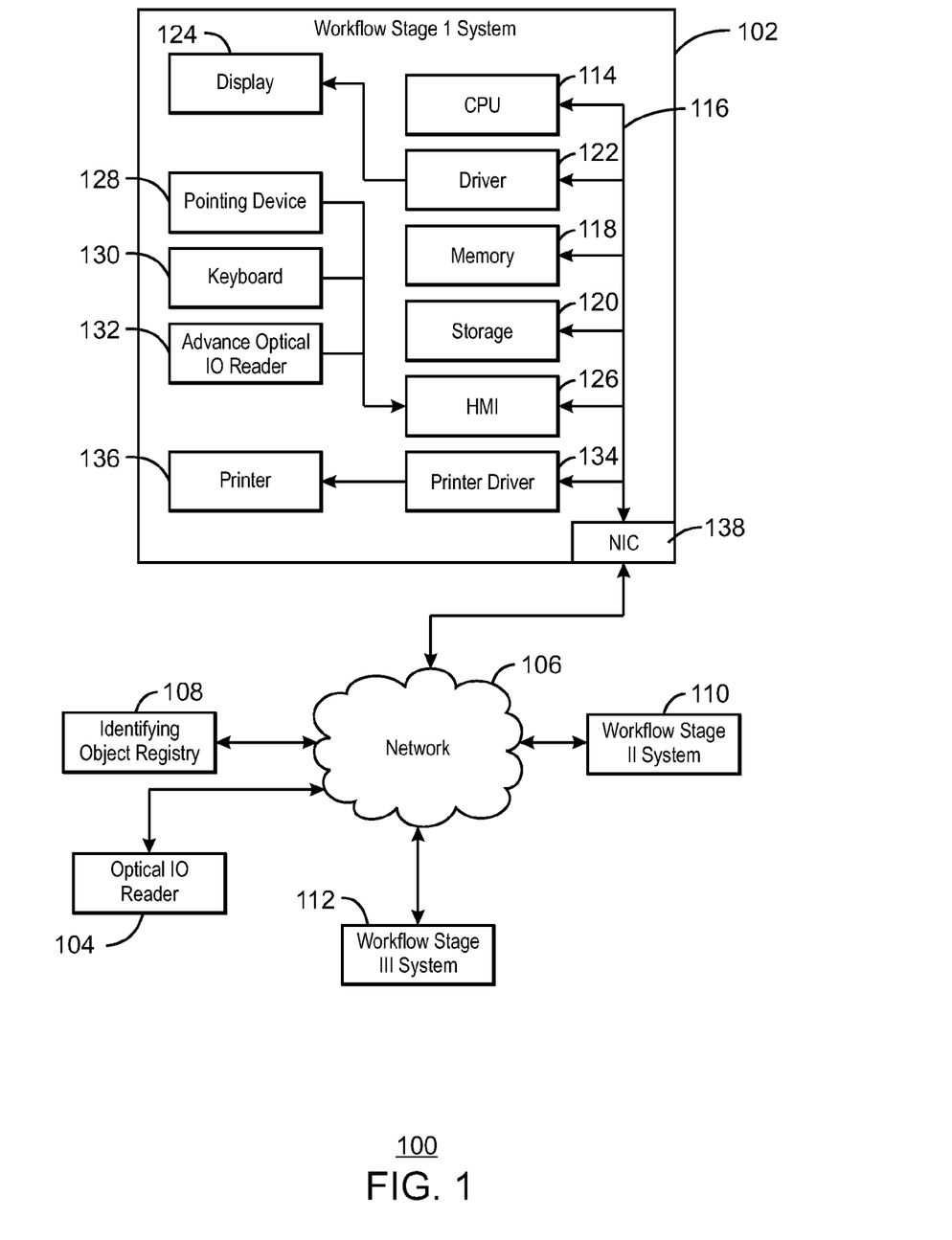
FIG. 1 is a schematic diagram of a system for generating a progressive mark, e.g. an incremental information object (IIO), from an initial information object (IO) during a workflow, in accordance with an example.

FIG. 1 is a schematic diagram of a system 100 for generating an IIO from an IO during a workflow. The workflow may start at a first stage system 102. Any number of systems for stages in the workflow may be included, depending on the specific workflow. In addition, a standard optical IO reader 104 may be used to image the IO and send the image through a network 106 to an identifying object registry 108 to determine the code within the IO. The identifying object registry 108 may then send the code information back to the optical IO reader 104. The optical IO reader may 104 may also operate independently of the system 100 by scanning and reading an IO without sending the IO image to the identifying object registry 108.

The network 106 may be a local area network (LAN), a wide area network (WAN), or the Internet, and may include both public and private network segments, such as virtual private networks (VPN). In an example, the standard optical IO reader 104 may be a mobile device or imaging device capable of behaving as a standard optical IO reader 104, while simultaneously sending the IO image through the network 106 to the first stage system 102 to be analyzed for progressive information. In another example, the standard optical IO reader 104 may be used to obtain an IO that may be sent through the network 106 to the first stage system 102, where it may be altered to become an IIO through the addition of very light colors to tiles within the IO.

The first stage system 102 may access an identifying object registry 108 over a network 106 to obtain additional information about the IO, such as rules for increasing the information density of the IO through the use of progressive color scales. Other stages of the workflow may have associated systems, such as the stage two system 110 and the stage three system 112 illustrated in FIG. 1. The first stage system 102 may be used either to coordinate the physical transfer of a product to the second stage system 110 or to directly transfer a product in electronic form. Similarly, the stage two system 110 may transfer or coordinate the transfer of the product to the stage three system 112. At each stage, information may be sent to the next stage's system to confirm the IIO. For example, the information may include the rules used to increase the complexity of the IO at an earlier stage in the workflow with progressive color scales, or any other rules that may be used to create an IIO from an IO. Stages, security levels, and the like, may be added in the workflow by increasing the complexity of the IO. In an example, the system at a particular stage can increase the amount of information stored within the IO or current IIO by communicating with the identifying object registry 108. In another example, the amount of information stored within the IO or current IIO may be increased by following rules initially issued by the identifying object registry 108.

Any of the stage systems 102, 110, and 112, or identifying object registry 108, may include units to provide the functionality used to generate the IIO, as shown for the first stage system 102. These units may include a central processing unit (CPU) 114. The CPU 114 may include a single core processor, a multi-core processor, or a cluster of processors, for example, in a cloud-computing configuration. The CPU 114 may communicate with other units over a bus 116, which can include a PCI bus, a PCIe bus, an optical bus, or any other suitable type of bus.

A memory 118, such as random access memory (RAM) or read-only memory (ROM), may be used to store operating programs and data to implement the methods described herein. As used herein, programs include machine readable code to direct a processor to implement various functions. Similarly, a storage system 120 may provide longer-term storage for data and programs. The storage system 120 may include, for example, a hard drive, an optical drive, a flash drive, a memory drive, and the like. The memory 118 and storage system 120 provide a non-transitory, computer readable medium for storing programs and data to implement the techniques described herein, as discussed further with respect to FIG. 9.

Other units may also be included to provide further functionality. For example, the stage systems may include a display driver 122 to drive a display 124, which may be used to display the product and the IO. A human-machine interface (HMI) 126 can be used to interface with a number of input devices, such as a pointing device 128, including, for example, a mouse or touchscreen, among others. The HMI 126 may also provide an interface to a keyboard 130. In addition, the HMI 126 may provide an interface to an advanced optical IO reader 132, which may be used to image an IIO in order to obtain a progressive code. The advanced optical IO reader 132 may be a mobile or imaging device that is to read IIO's. A printer driver 134 may be used to interface with a printer 134 to print the IIO, the product, or both. The printer 136 may be a general-purpose unit, such as a laser printer or an ink jet printer, or may be a dedicated unit to overprint an IO or IIO with additional information. In addition, a network interface card (NIC) 138 may be provided to permit the stage systems to access the network. The NIC 138 may include a wired Ethernet interface, a wireless network interface, or a mobile network interface.

A number of possible workflow patterns may be implemented on the system 100 discussed above. For example, the workflow may follow the patterns discussed with respect to FIGS. 2 and 3.

Figure 2:
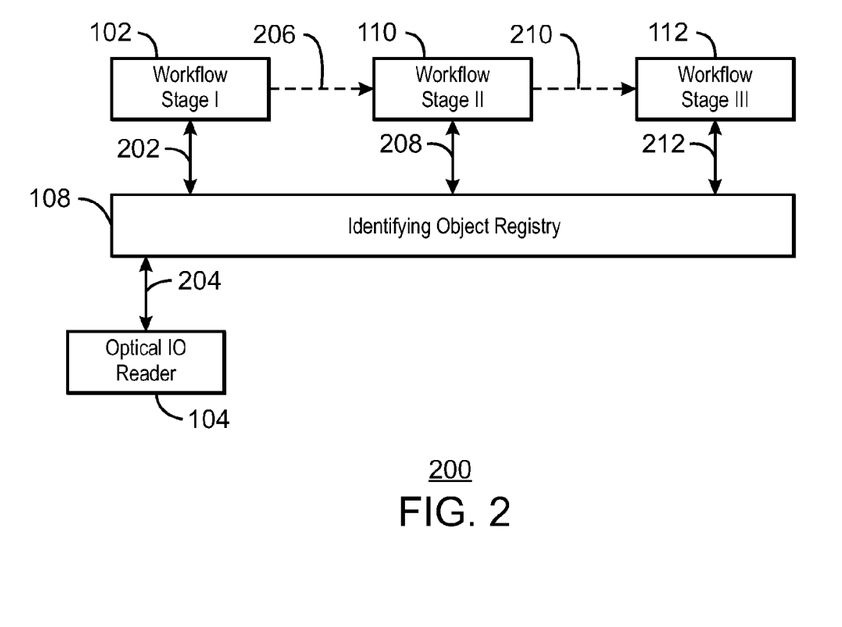
FIG. 2 is block diagram of a workflow using a centralized identifying object registry for confirmation of a product, in accordance with an example.

FIG. 2 is block diagram of a workflow 200 using a centralized identifying object registry 108 for confirmation of a product. If the registry-based workflow 200 is utilized, the first stage system 102 exchanges information used to generate an IIO, for example, from an IO, with the identifying object registry 108, as indicated by arrow 202. The information 202 may include the rules used to increase the complexity of the IO through the addition of progressive color scales. In an example, the information 202 exchanged includes all of the information needed to write the IIO, with the identifying object registry 108 retaining all coding information. In another example, an optical IO reader 104 is connected to the identifying object registry 108 and sends the IO to the identifying object registry 108, as indicated by arrow 204. The identifying object registry 108 may analyze the IO image from the optical IO reader 104 to determine a code and send the information back to the optical IO reader 104, as indicated by arrow 204. In another example, the identifying object registry 108 may send the code information obtained from the IO image to the first stage system 102.

It should be noted that the optical IO reader 104 may not be attached to the identifying object registry 108. Rather, an off-the-shelf handheld optical IO reader 104 may also be used to directly read the static data within the IO at any point in the workflow.

At the next stage in the workflow 200, the second stage system 110 receives a package 206 of information from the first stage system 102. The package 206 may include a document and the associated IO. In the case of a physical product, the package 206 may be physically transferred from one stage to the next in the workflow. The second stage system 110 may then confirm the IO, for example, by decoding the image to form a bitstream including the code and then exchanging information 208, including the bitstream, with the identifying object registry 108 for confirmation of the information 208.

At any stage 102, 110, or 112 of the workflow 200, after confirmation of the previous code, the complexity of the IO may be increased by adding progressive colors to the IO. This can be performed by communicating the requested change to the identifying object registry 108 and receiving instructions for changing the IO to include additional progressive information. Thus, the information 208 returned from the identifying object registry 108 may include information confirming the IO, the IIO, or both, and information for generating a more complex IIO for the next stage of the workflow. In an example, the information 208 from the identifying object registry 108 may include all of the information used to directly form the IIO, including all of the increases in complexity.

To advance the workflow, the second stage system 110 sends a package 210 on to the third stage system 112. The package 210 may include a physical product as discussed for the package 206 transferred from the first stage system 102 to the second stage system 110. The third stage system 112 can then confirm the IIO by decoding the image to form a bitstream, and exchanging information 212 with the identifying object registry 108, including the bitstream, for confirmation of the IO, the IIO, or both.

As discussed herein, the techniques are not limited to only three workflow stages, but may include any number of workflow stages, both in series and in parallel. In the example shown in FIG. 2, the addition to the IO, or changes in the complexity of the IIO at each stage in the workflow 200, can be performed in conjunction with the identifying object registry 108. However, an independent incremental workflow may be utilized, without backward visibility in the workflow stage-stage transmission, as discussed further with respect to FIG. 3.

Figure 3:
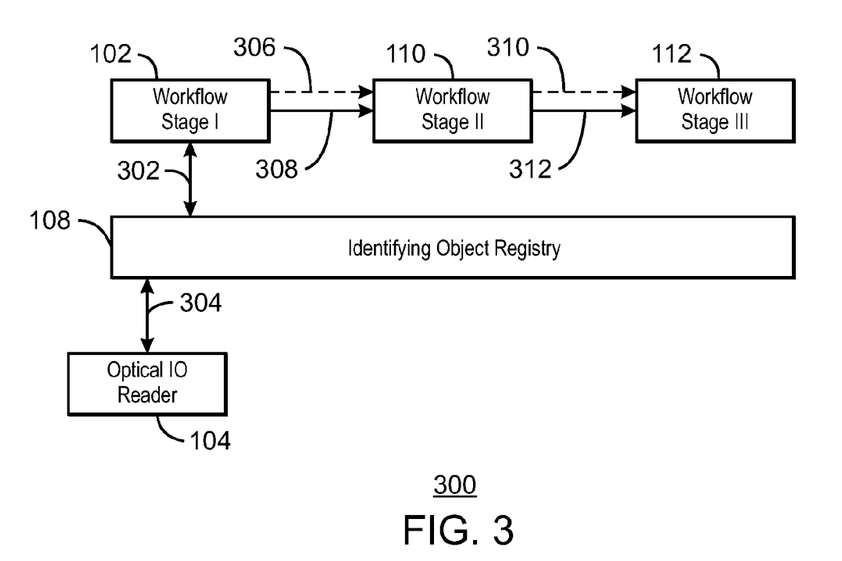
FIG. 3 is block diagram of a workflow that obtains initial codes and instructions from the identifying object registry and uses the systems at each stage of the workflow to confirm the product and make any changes to the complexity of the IO, in accordance with an example.

FIG. 3 is block diagram of a workflow 300 that obtains initial codes and instructions from the identifying object registry 108 and uses the systems at each stage of the workflow to confirm the product and make any changes to the complexity of the IO by adding progressive information, in accordance with an example. In this example, the first stage system 102 exchanges information 302 with the identifying object registry 108. As described with respect to FIG. 2, the information 302 may include the rules for adding any color scales to the IO in order to create an IIO. In addition, an optical IO reader 104 may be connected to the identifying object registry 108 and may send the IO to the identifying object registry 108, as indicated by arrow 304. The identifying object registry 108 may analyze the IO image from the optical IO reader 104 to determine a code and send the information back to the optical IO reader 104, as indicated by arrow 304. In another example, the identifying object registry 108 may send the code information obtained from the IO image to the first stage system 102. The IIO at each stage of the workflow can be deduced when the starting point is known, such as the initial or first code, as most workflows have a small and well-defined set of stages.

At the next stage, the stage two system 110 receives the product 306 and the information 308 that may be used to confirm the IIO on the product. For example, the information 308 may include an intelligent hash of the previous state of the IIO from the first stage system 102, among other items, such as the rules used to increase the complexity of the IO. In this example, the stage systems may not have access to the identifying object registry 108, and the addition to the IIO at each stage in the workflow will be performed in conjunction with initial instructions received from the identifying object registry 108. This example may be useful, for example, when the distribution network organization is proprietary.

After the work at stage two is completed, the stage two system 110 may forward the product 310, including the IIO, to the stage three system 112, along with the information 312 needed to confirm that earlier added information is correct. In an example, the information includes rules for increasing the amount of progressive information stored within the IIO. It should be understood, however, that the changes in complexity of the IO will not affect the identity or information content of the IO as read by a standard optical IO reader. The progressive information that has been added to the IO in the form of light color scales, i.e., generally colors of intensities similar to that of very light gray, may only be registered by a computer-implemented software program that is to read IIO's. This is possible because current optical IO readers register differences in intensity, not chroma or hue. Therefore, if a very light color, such as cyan, magenta, or yellow, is added to a white tile, it will simply be read as a white tile by a standard optical IO reader. In this manner, it is possible to add progressive information to the IO throughout multiple stages of a workflow without compromising the functionality of the IO or the ability to confirm the identity of the IO. In effect, a standard IO reader will interpret the IIO as identical to the IO throughout the entire workflow. In an example, this type of IIO may be useful for increasing the security features of an IO, while maintaining the ability to use the new IIO for the same purpose as the IO.

In an example, a two-dimensional or three-dimensional IIO that is created may be used for two purposes, i.e., a point of sale and mass serialization for the colors. In other words, the IIO may be used as a traditional, IO and an IIO at the same time because it effectively combines a static IO and dynamic IIO into one multi-dimensional IIO. In addition, in an example, a two-dimensional or three-dimensional IIO may be used for a variety of workflows, including a multi-person composite document.

As described herein, the identifying object registry 108 can include hardware, such as processors, memory, and storage. Further, the identifying object registry 108 and each of the workflow stage systems 102, 110, and 112, may include software for generating an IIO. In an example, access to the identifying object registry 108 may be secure, for example, requiring a login and password or other authorization methods, such as biometric validation of identity, possession of a secure token, and the like. In another example, the identifying object registry 108 may be unsecure, e.g., being publicly accessible.

In some examples, the system 100 may be hosted by a cloud computing network, which may be a virtualized bank of computers including servers that enable Internet-based computing. Shared resources, software, and information may be provided to various computing devices through the cloud computing network. The computing devices may include the workflow stage systems 102, 110, or 112, which may be stationary, such as desktop computers, or mobile, such as laptop computers, netbooks, cellular phones, personal digital assistants (PDAs), and the like. The cloud computing network may allow a registry system provider to deliver access to the identifying object registry 108 and its various services to subscribers online via another web service or software, such as a web browser. Software and data associated with the cloud computing network may be stored on servers and their associated memory.

Thus, as a result of the workflow described above, the IIO contains an incrementally increasing amount of progressive information at each stage of the workflow. This is discussed with respect to FIG. 4.

Figure 4:
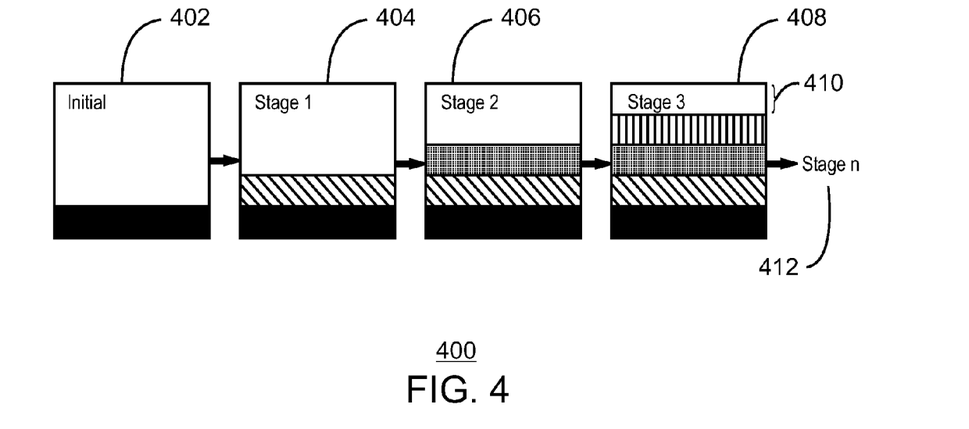
FIG. 4 is a schematic of changing the complexity of an IO during a workflow, in accordance with an example.

FIG. 4 is a schematic 400 of changing the complexity of an IO during a workflow, in accordance with an example. The IO can have an initial number of bits set to provide randomness or "entropy" to the code, making it less probable that the code may be guessed. These entropy bits provide a first amount 402 of information in the IO. At the completion of the first stage of the workflow at block 404, the IO is overwritten. The IO then contains a second and increased amount of information, which is transferred to the second stage of the workflow, and may be termed an IIO. After completion of the second stage of the workflow, at block 406, the IIO has a third and further increased amount of information. At block 408, the third stage of the workflow is completed, and the IIO contains a fourth amount of information. A portion 410 of the bits that may be written are left blank in the IIO, providing entropy for the final IIO. In an example, the amount of information contained in an IO is changed at a stage 404, 406, or 408, to accommodate a change in the workflow and to create an IIO. More information may be added to the IIO at further stages 412, until the maximum amount of information has been encoded in the IIO.

Figure 5:
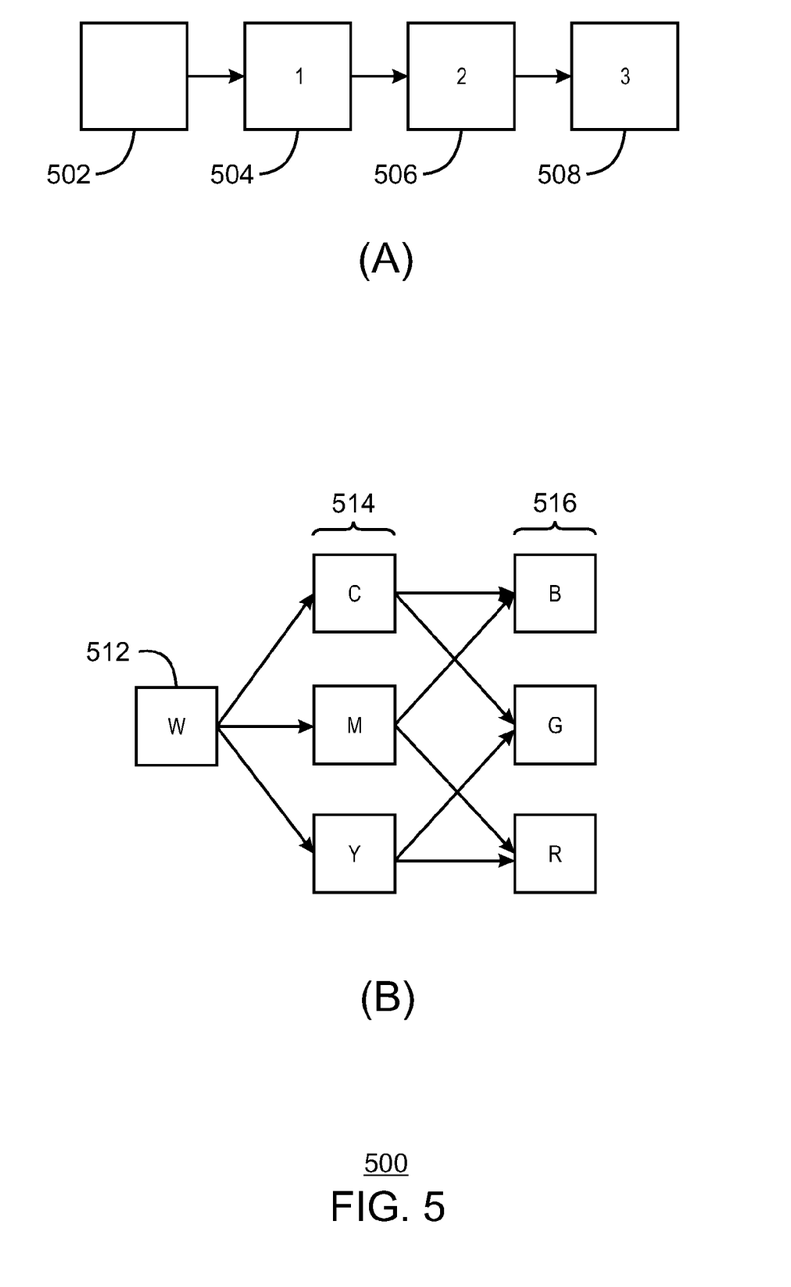
FIG. 5 is a schematic illustrating the use of a multi-level gray or color scale to increase the information content of a single tile, in accordance with an example.

FIG. 5 is a schematic 500 illustrating the use of a multi-level gray or color scale to increase the information content of a single tile 502 or 512, in accordance with an example. In FIG. 5(A), each time a bit value of one is written to the tile, the grayscale intensity may be increased by 25%, for example, going from white to 25% gray at the first bit, as indicated by the second tile "1" 504. Another bit value of one may increment the intensity to 50% gray for the second bit in a third tile "2" 506, to 75% gray for the third bit in a third tile "3" 508.

The use of the grayscale changes the IO to a three dimensional IIO. It can be noted that the grayscale values are not limited to four intensity levels, as any number of intensity levels may be used, so long as they can be clearly distinguished. In general, N possible states for a single tile may store Log(N)/Log(2) bits in that tile.

A similar increase in information content may be realized by using a color scale, as shown in FIG. 5(B). In this example, a white tile may encode a bit value by being changed to any one of a first set 514 of colored tiles, e.g., a cyan tile "C", a magenta tile "M", or a yellow tile "Y". The colors for the first set 514 of tiles may be adjusted to reach more complex colors in a second set 516, for example, by overlaying a tile in the first set 514 with different tones or hues. Thus, a C colored tiled in the first set 514 may be adjusted to be either a blue "B" tile or a green "G" tile in the second set 516. Similarly, an M colored tile may be adjusted to be either a B colored tile or a red "R" colored tile in the second set and a Y colored tile may be adjusted to be either a G colored tile or an R colored tile.

As for the grayscale tiles, the use of the colored tiles changes the IO to a three dimensional IIO. Although seven colors are shown, any number of colors may be used, so long as they may be clearly distinguished by a specialized IIO device, e.g. an advanced optical IO reader. As the seven different colors may encode seven bits, the information density of the IO increases by a factor of Log(7)/Log(2)=3.

In examples, the amount of information stored in an IO is changed by converting a binary IO, e.g., using dark and light tiles, to a grayscale or color IIO by writing different colors or intensities. The use of very light gray or color scales to an IO may be useful for conveying progressive information. Therefore, it may be desirable to use gray or color scales that are not clearly distinguishable by a standard reader device, but are only distinguishable by specialized hardware or a software program. In this way, another plane of information content is added to the IO in the form of progressive color scales without altering the overall identity of the IO. In an example, an IO and an IIO created from the IO may be interpreted as identical according to a standard, commercially-available optical IO reader. However, when analyzed by a specialized software program, it may become apparent that the IIO has a much higher degree of information content than the IO.

It should be noted that the IO patterns, e.g., the dark tiles, are not affected by the information added to the lighter tiles. Accordingly, transitions to fully black, as discussed with respect to FIG. 5, are not permitted, as such transitions would change the code of the base IO.

Figure 6:
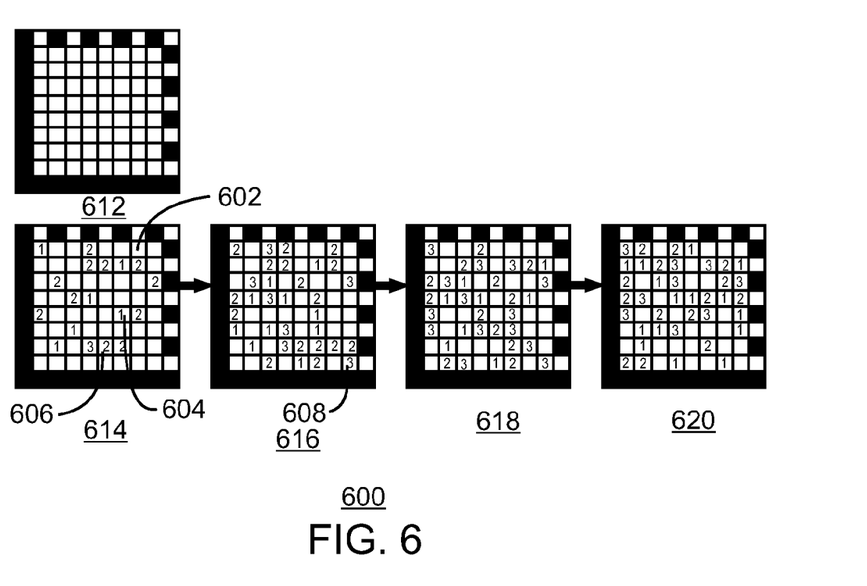
FIG. 6 is a schematic showing an example of changes to tiles that may be seen in combining a two-dimensional IO with a multi-level gray scale for each tile, in accordance with an example.

FIG. 6 is a schematic 600 showing an example of changes to tiles that may be seen in combining a two-dimensional IO with a multi-level gray scale for each tile, in accordance with an example. In FIG. 6, tiles with no number 602 are white tiles, tiles bearing a "1" 604 are at 25% intensity, tiles bearing a "2" 606 are at 50% intensity, and tiles bearing a "3" 608 are at 75% intensity. The numbers also correspond to the number of bits, having a bit value of one, which have been written to a tile.

In this example, a blank IO 612 may have 20% of the available storage space overwritten with entropy bits, forming the IO 614. During the first stage of the workflow, the IO 614 may be overwritten with a bitstream taking another 20% of the available storage space in the resulting first stage IIO 616, which is 40% full. Similar changes in the available storage space may occur after the second stage of the workflow, resulting in a second IIO 618 that is 60% full, and after the third stage, resulting a third IIO 620 that is with 80% full. The remaining 20% may be left blank to provide entropy to the third IIO 620. It should be understood that the amounts used herein at each stage of the workflow are merely examples, as any percent completion may be used.

Figure 7:
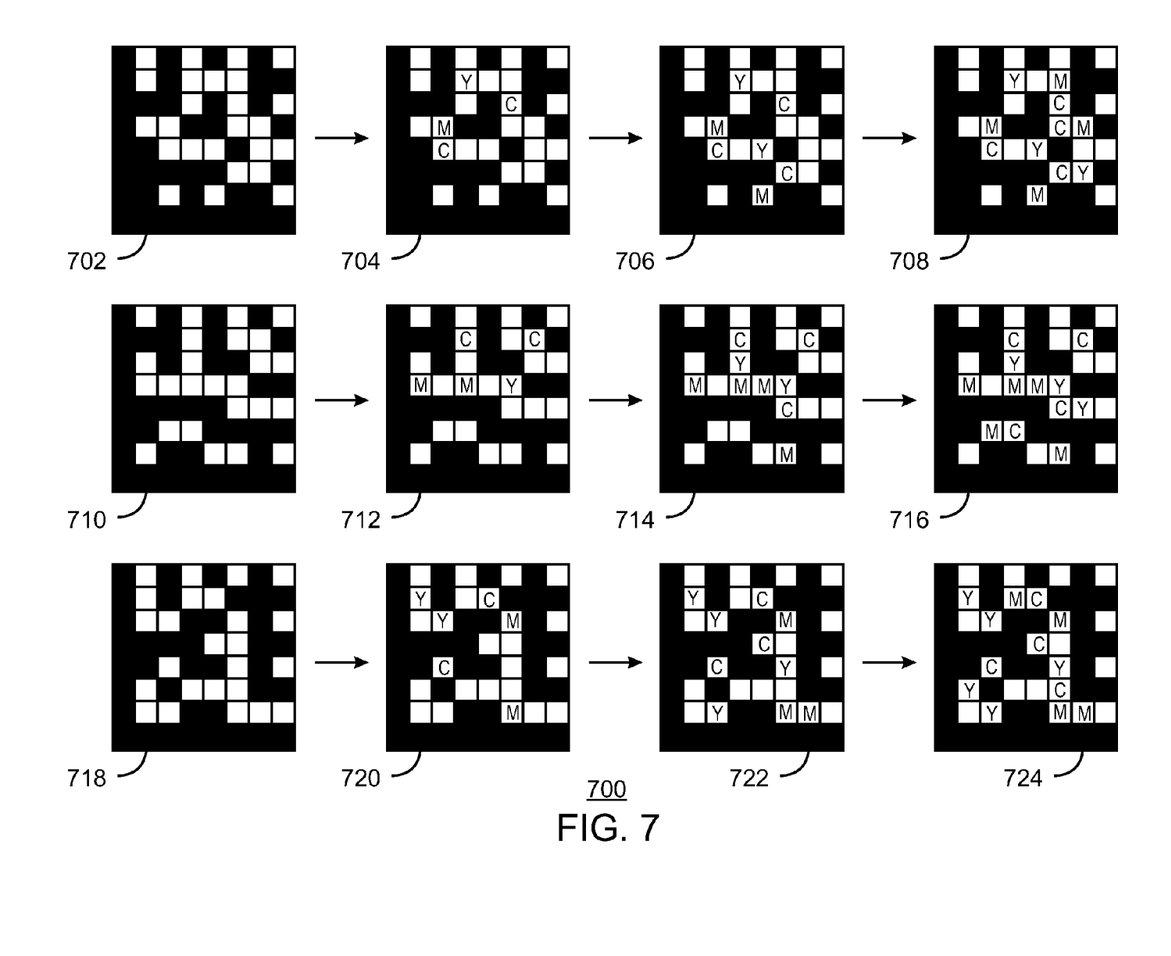
FIG. 7 is a schematic illustrating examples of generating a two-dimensional IIO from an IO, in accordance with examples.

FIG. 7 is a schematic 700 illustrating examples of generating a two-dimensional IIO from an IO. The columns indicate the progression along a workflow. The first IO 702 on the top row is progressively changed to overwrite light, saturated colors onto the white tiles to convey additional progressive information. In FIG. 7, the progressive colors include light yellow, "Y," light cyan, "C," and light magenta, "M." The IIO's 704, 706, and 708 created from the first IO 702 on the top row contain an increasing amount of progressive information. The first IO 710 on the middle row is progressively changed to obtain the IIO's 712, 714, and 716. The first IO 718 on the bottom row is progressively changed to obtain the IIO's 720, 722, and 724. The IIO's that are obtained may still be interpreted by a 2D optical IO reader as the non-progressive, IO's. For instance, in the case of light, saturated colors overwritten on white tiles, the optical IO reader may still interpret those tiles as "white." The progressive information may only be recognized by specialized hardware or a software program. Therefore, from the perspective of a standard optical IO reader, the IO remains unchanged throughout the entire progression of the workflow. In an example, a progressive bitstream may be written using a color scale to overwrite a two-dimensional IO and create a three-dimensional IIO. In another example, a progressive bitstream may be written using a color scale to overwrite a one-dimensional IO and create a two-dimensional IIO.

Figure 8:
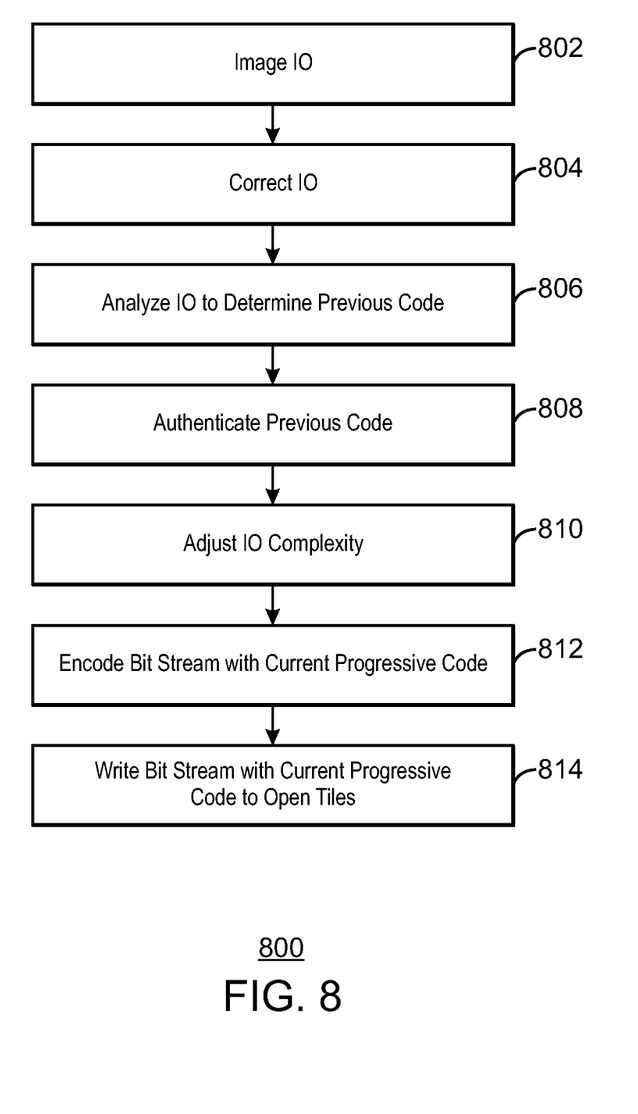
FIG. 8 is a flow diagram of a method for generating an IIO from an IO, in accordance with an example.

FIG. 8 is a flow diagram 800 of a method for generating an IIO from an IO. It should be understood that this flow diagram 800 is not intended to indicate that the steps of the method should be executed in any particular order, or that all of the steps of the method should be included in every case. Referring also to FIG. 1, prior to configuring the system 100 and its various components to generate an IIO from an IO, the expected number of stages in the workflow can be set and a number of bits to write in total and during each state of the workflow can be selected. In some instances, however, the number of bits may be dynamically determined at any stage in the workflow. For example, if additional bits need to be added for security at a stage of the workflow that takes place outside of a secure environment. In one example, an IO may be selected first and then the workflow and number of bits may be designed around the selected IO. In another example, the workflow and the number of bits may be selected, and then the IO may be selected to fit the specifications of both the workflow and the total number of bits to be carried. In an example, the information density of the IO may be adjusted by adding progressive information to the IO during the workflow to accommodate a change in the number of stages, security needs, and the like. The progressive information may be added in the form of light, saturated color scales overwritten onto white tiles. In another example, the progressive information may be added in the form of dark, unsaturated color scales overwritten onto black tiles.

In examples in which the IO is selected after the total number of bits is identified, the identifying object registry 108 may consider the total number of bits to be written to the IO and whether it is desirable to include entropy in the identifying object. At this stage, other considerations may also be taken into account, such as to include non-payload indicia in the identifying object, the number of code regions to be used to form the IIO, and the relationships between the code regions. In some cases, non-readable progressive tile calibration colors may also be added to the non-payload indicia white tiles.

The probability of guessing the initial state with less than a specified statistical probability may be added prior to the initiation of the workflow by partially filling available tiles of the IO. It can be understood that a partially completed state of the IIO has greater security, statistically, than an all-white state of the IO.

The introduction of non-payload indicia (NPI) may also affect the size of the final IIO because non-payload indicia are included in tiles of the IO that may have otherwise been written to with bits. As described above, NPI do not contain payload (or data) bits, but rather are used for calibration, for example, to correct skew, calibrate intensity, and calibrate orientation of the initial or IIO, at each stage in the workflow. NPI may also be used for branding, symbology identification, or the like.

In one example, the IO, the code regions, the workflow, and the number of bits are created at the identifying object registry 108. The identifying object registry 108 includes a non-transitory, computer-readable medium with a computer program for selecting the IO, a number of stages in the workflow, a security level for each stage in the workflow, and a number of bits to be written at each stage in the workflow. The number of elements may be preselected before the workflow is initiated or dynamically determined as the workflow is in progress.

The workflow and preset number of bits may be set or defined using information received at the identifying object registry 108 from participants in the workflow. For example, a product manufacturer may request that a workflow be set up for a particular product, and may provide information to define the workflow, including such information as the distributor, the retailer, and product identification information, such as the serial number. The identifying object registry 108 may then select a suitable IO, generate a suitable workflow, and preset code region information to be stored in the IIO. The IIO design and the preset number of bits may also be set by the workflow and, thus, can be accessed using a number of methods.

In the example described with respect to FIGS. 1-4, the workflow may initially involve three stages, for example, a manufacturer, a distributor, and a retailer. At each stage, the workflow may require an individual to sign a document, such as by overprinting the IO or current IIO associated with the product, prior to shipping the product and document to the next entity, and may require an individual on the receiving end to sign the document upon receiving the product and document.

As described herein, the number of bits to write to the IO or current IIO at each stage of the workflow is proportional to the desired minimum level of security, on a statistical basis, at any given stage. High-level security stages may write more bits of information to the IO or current IIO, while low-level security stages may write less bits of information to the IO or current IIO. The number of bits to encode at each stage of the given workflow may be based on probability. For example, the number of bits can be chosen such that a given level of confidence is achieved, so that the next state of the IIO has less than a p probability of being guessed.

Hamming distance may also be used in the determination of the number of bits. As described herein, Hamming distance is the sum of bits, defined in the elements of the IIO that are different from one stage to the next. The Hamming distance between two sequences of bits, S(a) and S(b), or HD(S(a),S(b)), is given by Eqn. 1.

$$HD(S(a),S(b)) = \Sigma_{s=1}^{L} S(a) \otimes S(b) \qquad \text{Eqn. 1}$$

In Eqn. 1, $\otimes$ is the bit-wise XOR operator. Any associated mark that is used in concert with the IO may also be used to determine the number of bits, as an associated mark may increase the complexity of the IO, making guessing a code in the IO less probable.

Once the workflow is generated, including the various stages and the number of bits to be encoded in total and at each stage, and the IO is selected, the workflow is initiated. The workflow instructions may be transmitted electronically to at least the first stage system 102. The instructions may include, for example, the procedural rules for the transmission of the product, the actions, or purposes associated with the product, and either the total number of bits to encode or the number of bits to encode in the product's IIO at each stage in the workflow.

In one example, the systems used during subsequent stages in the workflow receive the instructions from the first stage system 102 or from a system used in previous workflow stage. In another example, the systems IIO or 112 used during subsequent stages in the workflow may retrieve the instructions from the identifying object registry 108, for example, via a network 106. In another example, the workflow may be initiated without transmitting the workflow instructions. For example, the document and its associated IO may be transmitted to the first stage system 102 in the workflow. It is to be understood that as long as the starting point of the workflow is known, one can deduce each stage of the workflow.

The method starts at block 802 by imaging an IO. The imaging may be performed by a standard optical IO reader 104, an advanced optical IO reader 132, a software object, a scanner, a camera, or any other suitable imaging device or code. The standard optical IO reader 104 may be utilized to image a standard IO for the purpose of adding progressive information to the IO throughout a workflow. The advanced optical IO reader, on the other hand, may be utilized to image an IIO for the purpose of decoding the progressive information or adding additional progressive information to the IIO. The IO or IIO is isolated or segmented from the surrounding content, such as by the use of non-payload indicia (NPI) that delineate the edges of the IO or IIO. At block 804, an image correction and calibration is performed. Calibration may involve orienting the IO or IIO using the non-payload indicia, dewarping the IO or IIO, deskewing the IO or IIO, calibrating the possible intensity levels, and the like. The calibration may be performed in conjunction with interpretation of the IO or IIO, or calibration may be performed and then interpretation of the IO or IIO may be performed.

At block 806, the image may be analyzed to determine the previous code in the IO or IIO. The codes may then be identified by incrementally determining the bits written to the tiles to generate a bitstream. For example, the bitstream may be determined by reversing a procedure used to write the bits. The bitstream may then be decoded using a public key to decode a bitstream encoded with a corresponding private key. Any number of techniques may be used to encode and decode the data between workflow stages, including the private/public key system, generation of an encoded numerical hash of the code, and the like. Further, in some examples, an identifying object registry 108 may be used to confirm the bitstream without further decoding, such as if the IIO effectively stored a secret string, nonce, or the like.

At block 808, the code may be authenticated, or confirmed, to validate the identity of the document, or product, and the previous stage. For example, this may be performed by querying the identifying object registry 108 with the bitstream. In some examples, the confirmation may be performed by comparing the decoded value to an expected value at a local stage system.

At block 810, if more complexity is needed in the IO, for example, due to added stages or higher security needs, the information density of the IO may be adjusted by adding progressive information to the IO. The adjustment may be performed by adding color to an IO, increasing the number of colors in an IO, or adding grayscale tiles to an IO. In an example, light, saturated colors may be added to white tiles in the IO to increase the complexity of the IO. In another example, light, saturated colors within an IIO may be overwritten with additional light, saturated colors to store more progressive information within the IIO. Furthermore, any combinations of these techniques may also be used to increase the information density of an IO or current IIO.

Once the complexity of the IO has been adjusted, at block 812, a new bitstream may be generated, for example, related to the current workflow stage. The new bitstreams may include an encrypted version of a hash, for example, generated using a private key. In some examples, a new bitstream for a progressive code is obtained from an identifying object registry 108 along with instructions for writing the more complex IIO.

At block 814, the new bitstream with the progressive code may be written over the IO or current IIO. The stage system 102, 110, or 112 performing the incremental writing may determine the location of remaining available candidate areas that can be written to, for example, tiles that are not already carrying NPI or are not full. A variety of mathematical techniques may be used to determine where to place the information, which may include a preset number of bits. Non-limiting examples of these techniques include scrambling, random/nonce, one-time-pad, encryption, data replication, etc. These techniques identify where the information can be added to the IO or current IIO. This may include identifying open tiles for data and writing the bitstream to the open tiles.

In one example, after the available candidate areas in the code region, or payload tiles, are identified, the first stage system 102 identifies or retrieves the preset number of bits, for example, from the workflow instructions, to be written. In some examples, the number of bits to be written at a particular stage may be determined automatically by the stage system 102, 110, or 112 performing the incremental writing or by a user. In these examples, the total number of bits to be encoded throughout the workflow is known, and the stage system 102, 110, or 112 at each workflow stage would add a suitable amount of information to the IO or current IIO. For example, a string containing 0's and then 1's incrementally to be written could be stored as a nonce and then the 2's would be incrementally written to the IO or current IIO stage by stage. As described herein, in an example, additional information may be stored in the IO by increasing the complexity of the IO and creating an IIO.

When determining how to write the information, the stage system 102, 108, or 110 will use the information from segmentation to identify the then-current intensity levels, color levels, and the like, of the available candidate areas in the IO. When determining how to write the information, the stage system 102, 108, or 110 will select a scrambling technique, if any, by identifying a mathematical technique to be used for incorporating the information for the current workflow stage. This technique may be random or nonce-based, or may be deterministic.

In instances where the workflow 200 is based on the identifying object registry 108, as discussed with respect to FIG. 2, the previous state of the IIO may be replicated using the network 106, so that random or nonce methods are valid when inputting new information. For example, the information to be added is provided by a random number generator and is stored in the identifying object registry 108. In this example, the newly added bits are randomly added, and the identifying object registry 108 can provide and store the random new bits.

In instances where the independent incremental workflow 300 is used, as discussed with respect to FIG. 3, each workflow stage may use an intelligent hash of the previous state of the code in the IIO. In this example, a deterministic approach may be used, in which the newly written information is determined from the current state of the IIO and any additional pre-populated information that distinguishes the IIO from other IIO's on the product, such as SKU specific information and mass serialization information. In one example, the IIO may be pre-populated with the SKU-specific information and mass serialization information to ensure each IIO is unique. In another example, if a document has other unique information, such as a routing number or another barcode/stock identifier for point of sale, the other unique information can be included in a digital signature, such as the output of an operation on a binary string using a private key, to create the next set of bits to write to the IIO.

When determining how to write the information, the stage system 102, 110, or 112 will also select a manner in which the state change results in a predictable change in the IO or current IIO. In one example, this may be accomplished when a binary string representation of the current state of the IO or current IIO is transformed with a security string, such as by using a private key to encrypt a binary string. When determining how to write the information, the stage system 102, 110, or 112 will also identify a writing scheme, which may be suitable for the then-current stage of the workflow. Further, the rules for increasing the complexity of the IO to increase the information density may be determined before the start of the workflow, so that the IO encoding remains predictable after the complexity is increased.

The stage system 102, 110, or 112 performing the incremental writing at workflow stage I then writes the information to form a new IIO. When writing, the stage system 102, 110, or 112 may use the incremental intensity or color process, the selected scrambling technique, the selected manner for achieving a predictable state change, any rules for increasing complexity in the IO, and the selected writing scheme to write the information to the IO or current IIO. During each writing stage in the workflow, previously written information is not generally removed or changed, but rather the additional information is added, changing the state of the IO or current IIO.

While the number of bits to be written is preset in one example, the actually writing of the information may take place dynamically as the workflow progresses. As such, the candidate areas that are actually written to are determined in real time according to, in part, the areas available for writing, the number of bits to be written and the mathematical techniques to be used.

The product and the IO or IIO, such as a document, can be printed and stored. When the IO or IIO is completely physical, the document with the IO or IIO printed thereon, as it was received, can be overprinted so that the newly written to areas will be filled in the printed version. When the IO or IIO is physical and electronic, the electronic version of the document and the incrementally written to IIO can be reprinted or overprinted, if desired. When the incrementally written to IIO is saved, it is to be understood that it will replace any prior versions of the IIO.

The product and incrementally written to IIO are then shipped, electronically or physically, to the next entity in the workflow, such as workflow stage II system 110, as described with respect to FIG. 1. Similarly, when the action, task, etc. set forth in the workflow stage II instructions have been performed, the IIO is incrementally written to according to the workflow stage II instructions, for example, following the same method 800. The document and its incrementally-overwritten IIO can then be printed and stored by the stage three system 112, which adds its increment to the IIO.

At each stage, the previous states of the IIO are still provable, either because there are no new available candidate areas in the later stages of the IIO or because the rules used to increase the information content of the IO are predetermined and, thus, predictable. In examples where the stage system 102, 110, or 112 at a stage in the workflow has access to all the rules governing writing at the previous stages, the stage system 102, 110, or 112 can automatically check all previous states of the IIO for validity when checking the then-current state.

In any of the examples disclosed herein, if multiple identifying objects are part of the same shipment, it may be desirable to have the same pre-filled set of data bits. In some examples disclosed herein, the IIO's retain a set amount of real estate on a document even though information is incrementally written thereto throughout a workflow. The state of the IIO and the then-current stage of the workflow may be determined directly from the intensity or color of the tiles and the percentage of the tiles that are filled in or saturated, even without knowing how to interpret the data embedded therein.

Figure 9:
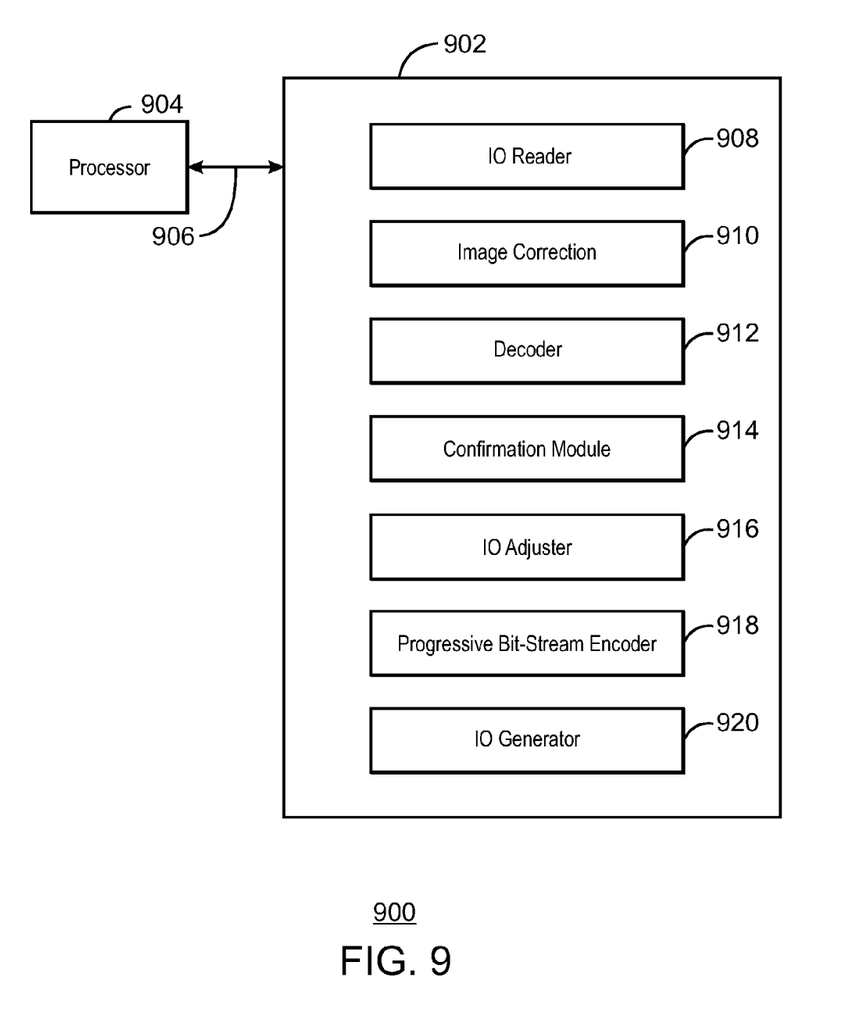
FIG. 9 is a block diagram of a non-transitory, computer readable medium containing code for generating an IIO from an IO, in accordance with an example.

FIG. 9 is a block diagram 900 of a non-transitory, computer readable medium 902 containing code for generating an IIO from an IO. A processor 904 may access the non-transitory, computer readable medium 900 over a bus 906, or other communication system, to obtain code to direct the processor 904 to confirm a product based on an IO associated with the product. The non-transitory, computer readable medium 902 may include any combination of read only memory (ROM), random access memory (RAM), hard drives, optical drives, RAM drives, or flash drives.

The non-transitory, computer readable medium 902 may include a module 908 to read an IO and a second module 910 to correct the image and calibrate the reader. Another module 912 may decode the IO to generate a first bit stream. A module 914 may confirm the code, for example, by following the instructions that should have resulted in the IO, or by accessing an identifying object registry. Another module 916 may be used to adjust the IO to create an IIO. This may be accomplished by increasing the amount of information contained within the IO through the use of color scales to progressively increase the information density of the IO at each stage in a workflow. A progressive bit-stream encoder module 918 may generate the codes needed to create the IIO from the IO or to add additional progressive information to an already-existing IIO. Another module 920 may then generate the IIO by identifying open tiles in the code regions of the IO or already-existing IIO and overwriting the progressive information onto the IO or already-existing IIO.

What is claimed is:

1. A method for generating an incremental information object (IIO) from an existing information object (IO), comprising:
    analyzing the existing IO to identify a code, wherein the existing IO comprises a plurality of tiles, and wherein the plurality of tiles comprise the code;
    confirming the code, wherein confirming comprises decoding an image of the existing IO;
    modifying the code by adding binary information to the code through the use of color scales to create a progressive code;
    generating a bitstream comprising additional colors used for the progressive code; and
    overwriting the bitstream with the progressive code onto the plurality of tiles IO generate the IIO, wherein the overwriting comprises physically printing information over the existing IO.

2. The method of claim 1, further comprising confirming that a new IIO may be recognized as the IO by an optical IO reader and may be recognized as an IIO by a software program.

3. The method of claim 1, comprising writing the bitstream using a color scale IO overwrite a two-dimensional IO and create a three-dimensional IIO.

4. The method of claim 1, comprising writing the bitstream using a color scale to overwrite a one-dimensional IO and create a two-dimensional IIO.

5. The method of claim 1, wherein modifying the IO through the use of color scales comprises substituting light, saturated color modules in place of white tiles in the IO.

6. The method of claim 1, wherein modifying the IO through the use of color scales comprises substituting dark, unsaturated color modules in place of black tiles in the IO.

7. The method of claim 1, comprising overwriting areas outside of and proximate IO tiles representing non-payload indicia (NPI) through the use of color scales.

8. A system for generating an incremental information object (IIO) from an existing information object (IO), comprising:
    a processor; and
    a memory, wherein the memory comprises computer readable code to direct the processor to:
        analyze the existing IO to identify a code, wherein the existing IO comprises a plurality of tiles and the plurality of tiles comprise the code;
        confirm the code, wherein an image of the existing IO is decoded to confirm the code;
        modify the IO by adding binary information to the IO through the use of color scales to create a progressive code;
        generate a bitstream comprising additional colors used for the progressive code; and
        overwrite the bitstream with the progressive code onto the plurality of tiles to generate the IIO, wherein the overwriting comprises printing the colors represented by the bitstream over the existing IO.

9. The system of claim 8, wherein the memory comprises computer readable code further to direct the processor to:
    confirm that a new IIO may be recognized as the IO by the optical IO reader and may be recognized as an IIO by a software program.

10. The system of claim 8, wherein the memory comprises computer readable code IO modify the IO by adding changes in color.

11. The system of claim 8, comprising a device to overprint the bitstream onto the IO physically located on a product.

12. The system of claim 8, wherein the optical IO reader comprises a handheld device, a mobile device, or a barcode reader IO read the IO.

13. The system of claim 8, wherein the software program comprises any computer-implemented machine readable instructions to read the IIO.

14. A non-transitory, computer readable medium comprising computer executable code stored thereon, which when executed, direct a processor to:
    analyze an existing information object (IO) to identify a code, wherein the existing IO comprises a plurality of tiles IO store the code;
    confirm the code, wherein an image of the IO is decoded to form confirm the code;
    modify the code by adding binary information to the code through use of color scales to create a progressive code;
    generate a bitstream comprising additional colors used for the progressive code; and
    overwrite the bitstream onto the plurality of tiles to create an incremental information object (IIO) using the bitstream with the progressive code, wherein the overwriting comprises printing the additional colors represented by the bitstream over the existing IO.

15. The non-transitory, computer readable medium of claim 14, further comprising code to direct the processor to: confirm that a new IIO may be recognized as the IO by the optical IO reader and may be recognized as an IIO by a software program.

\* \* \* \* \*

UNITED STATES PATENT AND TRADEMARK OFFICE
CERTIFICATE OF CORRECTION

PATENT NO. : 9,477,853 B2  Page 1 of 1
APPLICATION NO. : 14/235866
DATED : October 25, 2016
INVENTOR(S) : Simske et al.

It is certified that error appears in the above-identified patent and that said Letters Patent is hereby corrected as shown below:

In the Claims

In Column 16, Line 11 approx., in Claim 7, delete "IO tiles" and insert -- to tiles --, therefor.

In Column 16, Line 40 approx., in Claim 10, delete "IO modify" and insert -- to modify --, therefor.

In Column 16, Line 56 approx., in Claim 14, delete "IO store" and insert -- to store --, therefor.

Signed and Sealed this
Twenty-first Day of February, 2017

Michelle K. Lee
*Director of the United States Patent and Trademark Office*